United States Patent [19]

Falgout, Sr.

[11] Patent Number: 5,297,641
[45] Date of Patent: Mar. 29, 1994

[54] DRILLING DEVIATION CONTROL TOOL

[76] Inventor: Thomas E. Falgout, Sr., 110 Charles Read St., Lafayette, La. 70503

[21] Appl. No.: 997,162

[22] Filed: Dec. 28, 1992

[51] Int. Cl.$^5$ .............................................. G21B 7/08
[52] U.S. Cl. ...................................... 175/73; 175/61
[58] Field of Search ................................... 175/73-76, 175/61-82

[56] References Cited

U.S. PATENT DOCUMENTS

| | | | |
|---|---|---|---|
| 4,811,798 | 3/1989 | Falgout, Sr. et al. ................. | 175/73 |
| 4,858,705 | 8/1989 | Thiery ..................................... | 175/61 |
| 4,928,776 | 5/1990 | Falgout, Sr. ........................... | 175/73 |
| 5,096,003 | 3/1992 | Kinnan ................................... | 175/73 |

Primary Examiner—Thuy M. Bui
Attorney, Agent, or Firm—John D. Jeter

[57] ABSTRACT

An elongated body, capable of serving as a length of drill string, has two major portions with each portion providing an end for connection to the drill string with drilling fluid channels extending from end to end. One portion extends into the other and is hinged therein for deflection of the center lines of opposite ends. A piston in the body responds to drilling fluid flow to actuate the deflection of a few degrees. A turret carried by the body has a cam and groove relationship with the structure carried by the piston such that it turns one increment each time the piston makes a round trip of axial excursions. On alternate round trips of excursions, the piston is stopped short of the movement needed to deflect the body and instead holds the body straight until the fluid flow is reduced to begin another piston excursion. An internal valve is operated by the piston to cause a pressure rise in the drilling fluid stream when the piston moves enough to deflect the body. The fluid pressure change is detectable at the surface to indicate to the driller that the deflected state then exists.

16 Claims, 3 Drawing Sheets

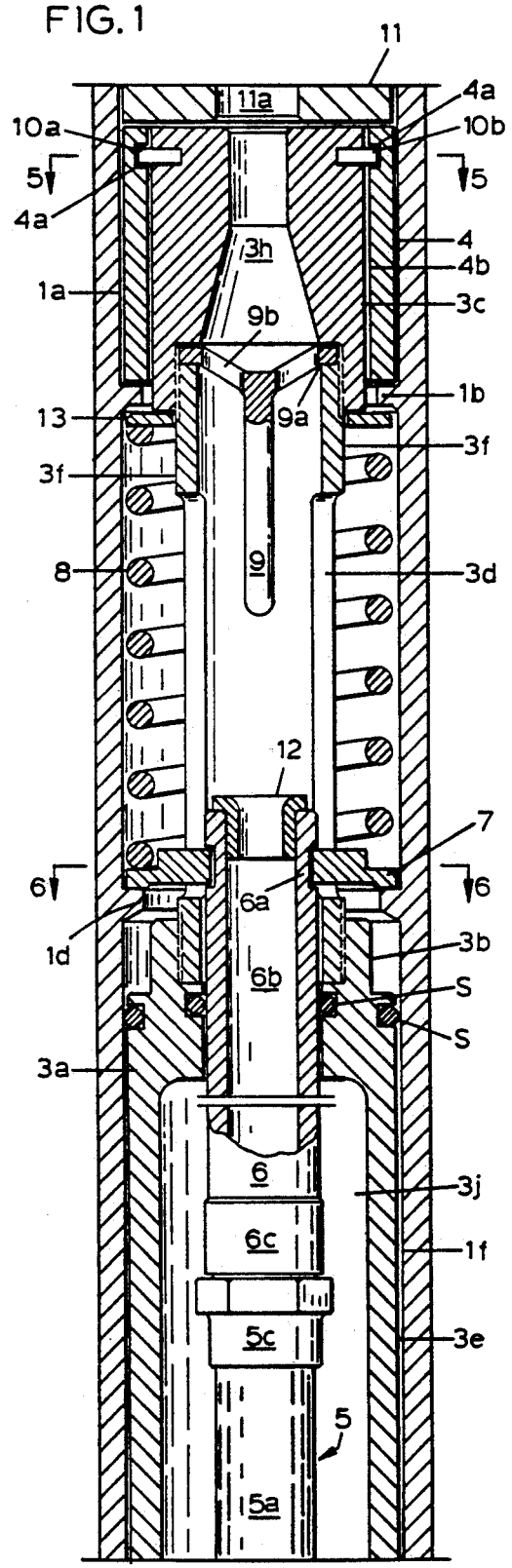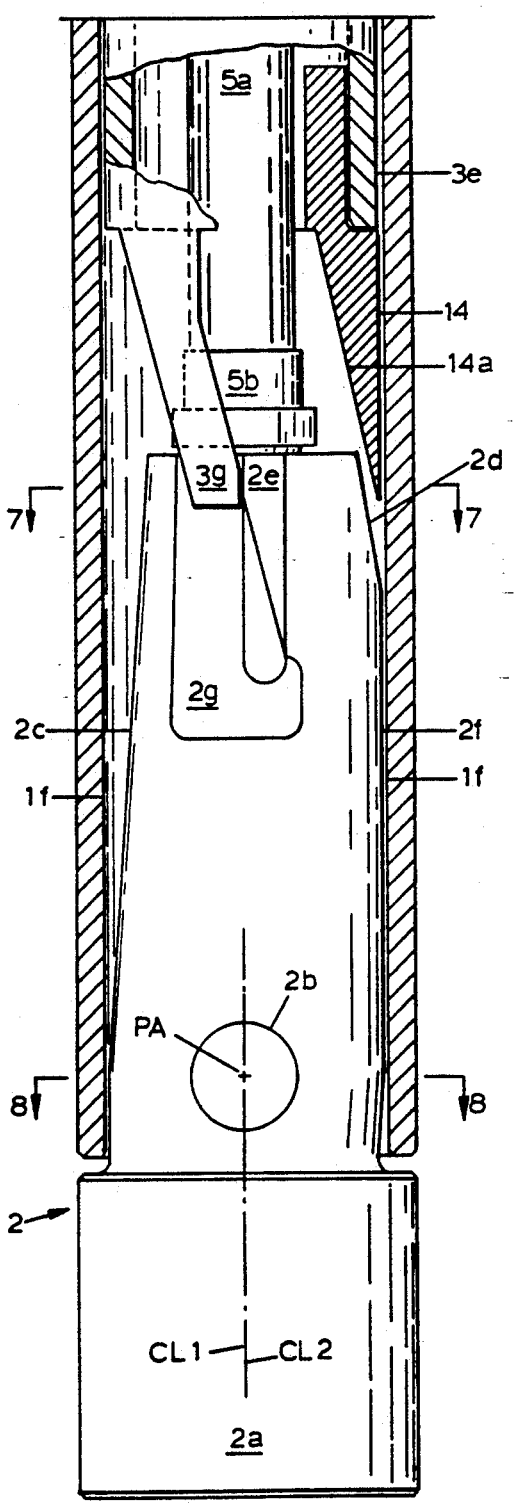

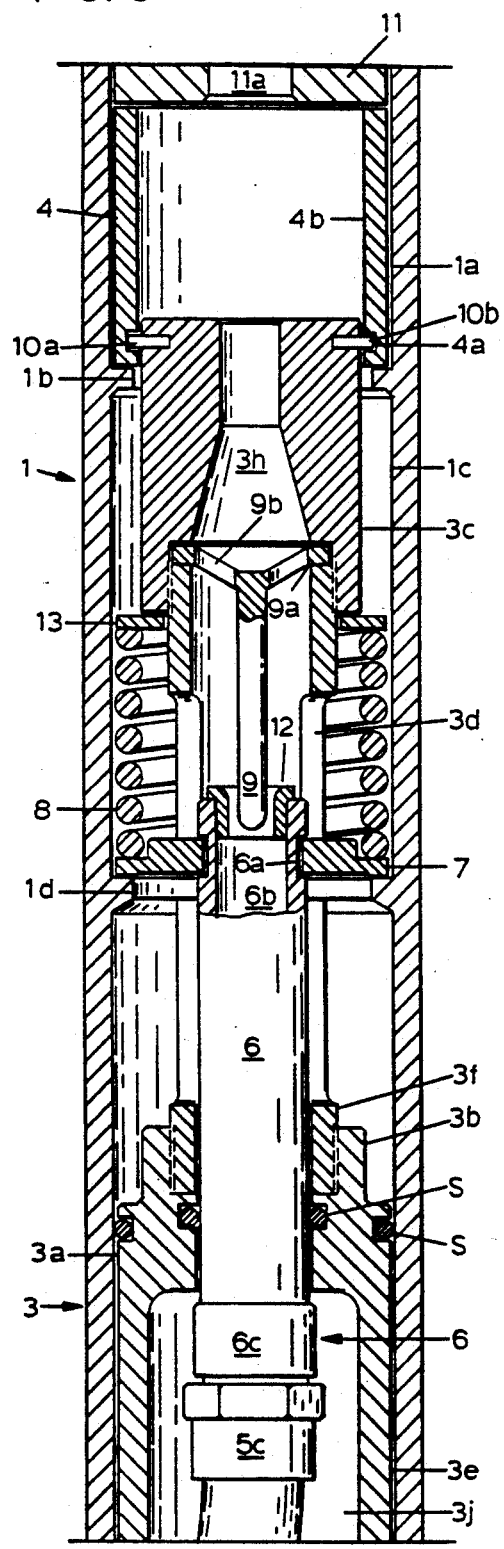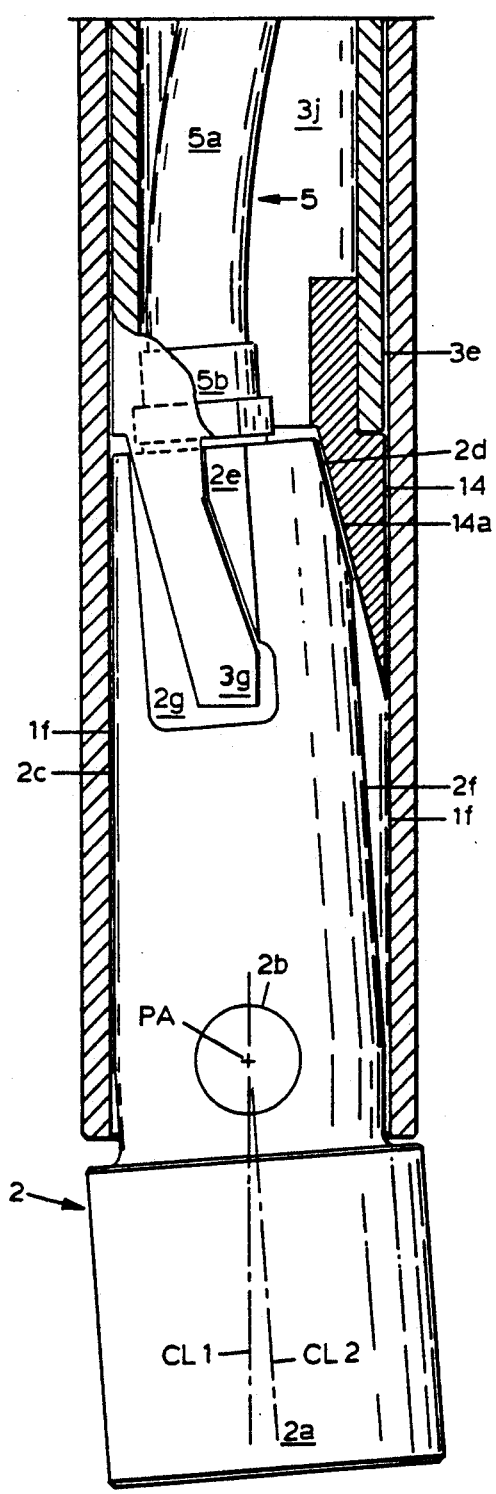

DRILLING DEVIATION CONTROL TOOL

This invention pertains to drilling tools used in the down hole assembly as part of a well string to control well bore deviation. More particularly, the tool responds to drilling fluid flow manipulations from the surface to permit the driller to change between a straight and a deflected down hole assembly.

BACKGROUND OF THE INVENTION

In recent years the use of active deviation control tools in the drill string bottom hole assembly has been commonplace. Whether to cause deliberate well bore deviation or to prevent unwanted deviation, elements of the down hole assembly are commonly used for the control purpose. Selective placement of stabilizers can sometimes be used by the skillful driller but results at best are somewhat uncertain. Rigid bent subs can be used above drilling motors, or within the motor body. These are not active in that the bend cannot be controlled from the surface but when used with down hole steering instruments to control rotational orientation they are reliable with the application of moderate driller skill and experience. Active deflection tools can be supplied to apply lateral force on the well bore wall to deflect the bit but these tools tend to be complicated and, hence, tend to be troublesome. Active tools to deflect the drill string centerline at a pivot point can be about the most simple of the active class. Adding the ability to operate as a straight tool or a deflected tool by choice of the driller at the surface adds little to the complexity and it is that tool to which this invention is directed.

It is therefore an object of this invention to provide apparatus responsive to the manipulation of the rate of flow of drilling fluid through the drill string to selectively cause the drill string centerline to deviate near the drill head of a down hole assembly.

It is another object of this invention to provide apparatus for use in the drill string near the drill head to respond to selected manipulation of the drilling fluid flow to maintain the centerline of the drill string in a straight configuration.

It is yet another object of this invention to provide apparatus near the drill head to respond to repeated selected manipulations of the drilling fluid flow rate to change the down hole assembly between bent and straight configuration each time the flow rate is selectively manipulated.

It is still a further object of this invention to provide a drilling fluid pressure signal, detectable at the surface, to indicate which configuration exists down hole.

These and other objects, advantages, and features of this invention will be apparent to those skilled in the art from a consideration of this specification, including the attached claims and appended drawings.

SUMMARY OF THE INVENTION

An elongated body serves as a length of drill string and has a pivot near the lower end about which the centerline of the body can be deflected. A piston is situated, for axial movement, within a cylindrical opening in the body and cooperates with the body to provide a power cylinder. Channels are provided to conduct drilling fluid through the body between tool joint connections on each end. Channels are provided to apply fluid pressure inside the tool to one side of the piston with the other side vented to the well bore outside the tool and pressure drop through the drilling assembly below the tool normally provides enough pressure differential to the piston to deliver all needed force. An optional flow restrictor, for use in the channel, will provide additional fluid pressure differential if necessary to move the piston in response to drilling fluid flow. Fluid pressure on opposite, flow related, sides of the restrictor is communicated to axially opposite sides of the piston. The piston is spring biased to move in a direction opposite that urged by increasing fluid differential across the piston. The piston is attached to a structure that extends to provide a cam situated to engage a cam follower surface on the pivotable portion of the body such that movement of the piston, a sufficient amount, causes the pivotable body portion to pivot to deflect the body centerline. Until the cam, and piston, has moved a preselected amount the cam structure has second cam surfaces arranged to engage mating cam follower surfaces on the pivotable portion to prevent deflection of the pivotable portion. When the piston, and cam, have moved a preselected amount the surfaces holding the body straight move out of engagement and the pivotable portion is free to deflect the centerline.

To simplify description, a drilling fluid flow rate cycle is defined as an increase in flow rate from less than a first preselected amount to a rate greater than a second preselected amount an then reducing the rate below said first preselected amount.

The body carries a turret that is free to rotate therein about the body longitudinal axis, or centerline, but it is axially secured therein. A plurality of cams mounted on the shuttle engage a serpentine groove in the turret that progresses peripherally thereabout to rotate the turret when the piston moves axially. The action of an individual cam will be described. The groove is shaped such that the cam, when moving from an axial excursion limit of travel will not retrace the preceding path but will enter the peripherally continuing groove to cause the turret to rotate only in one direction. At one axial extreme of the serpentine groove an axial groove is connected such that the cam, captured within the groove, permits the shuttle, and the connected piston, to move axially an amount greater than that permitted by the serpentine groove alone. On alternate cycles of the serpentine groove, the axial groove is shorter than those adjacent. The effect is to permit the piston to move axially to the deflection position when drilling fluid flow is cycled on even occasions and prevent deflection, and hold the centerline straight on odd occasions of similar flow rate cycles.

To indicate to the driller that the tool has actuated to deflect the centerline an optical fluid flow interference member attached to the shuttle approaches the flow restrictor, which is mounted on the body, to increase the resistance to fluid flow.

The pivotable portion of the body is attached to the rest of the body by a hinge assembly that axially secures the two portions together, conducts torque between the two body portions, and allows lateral deflection about a line generally perpendicular to the center lines of both portions of the body.

BRIEF DESCRIPTION OF DRAWINGS

In the drawings wherein like features have similar captions, FIG. 1 is an elevation, mostly cut away, of the upper portion of the tool.

FIG. 2 is a continuation of FIG. 1 showing the tool in the straight configuration.

FIG. 3 is identical to FIG. 1 except that the tool is in the deflected configuration.

FIG. 4 is identical to FIG. 2 except that the tool is in the deflected configuration, or state.

DETAILED DESCRIPTION OF DRAWINGS

Figure 5:
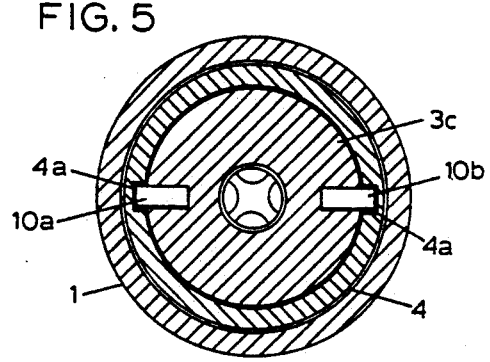
FIG. 5 is a sectional view taken along line 5—5 of FIG. 1.

In the drawings many features related to manufacturing and maintenance utility, well established in the art and having no bearing upon points of novelty, are omitted in the interest of clarity and descriptive efficiency. Such omitted features may include fasteners, threaded junctures, weld lines, and the like.

FIGS. 1 and 2 are mutual extensions. The member 11 is usually the lower end of a tool joint pin threadedly connected to the body portion 1. That threaded connection is common to the art, has means at the distal end to connect to a continuing pipe string and only the lower end is shown. Assembly 3, the shuttle, is situated to move downwardly in the body portion 1 as shown in FIGS. 3 and 4. In common use, fluid flows through the tool from the upwardly continuing pipe string to the downwardly continuing pipe string connectable to tool joint 2a. Fluid flows from bore 11a, through bore 3h, through holes 9b, through the flow restrictor 12, along bore 6b into and through hose assembly 5, to and through a bore (not shown) in lower portion 2. Flow tube 6 does not move up and down with assembly 3. Tube 6, and the hose assembly 5, are supported axially by split support washer 7 which stands on flange 1d and engages peripheral groove 6a through windows 3d in tower 3f.

Figure 6:
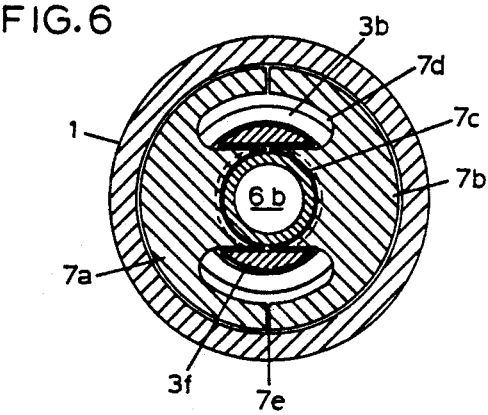
FIG. 6 is a sectional view taken along line 6—6 of FIG. 1.

Fluid pressure above restrictor 12 is conducted to the top of piston 3a through ports 7d in washer 7 (see FIG. 6). Fluid pressure below piston 3a is derived from the well bore annulus through the unsealed annulus between body portion 2 and bore 1f of body portion 1.

Body portion 2 is axially and rotationally connected to body portion 1 by transverse pin 2b for limited pivoting movement about transverse pivot axis PA. FIG. 2 shows the straight configuration and the extended rotational axis CL1 of portion 1 and the rotational axis CL2 of portion 2 are seen to generally coincide. With assembly 3 in the upward position shown cams 3g extending from piston skirt 3e engage cam follower surfaces on keys 2e to urge surface 2f against bore surface 1f to provide a rigid drilling assembly.

Figure 9:
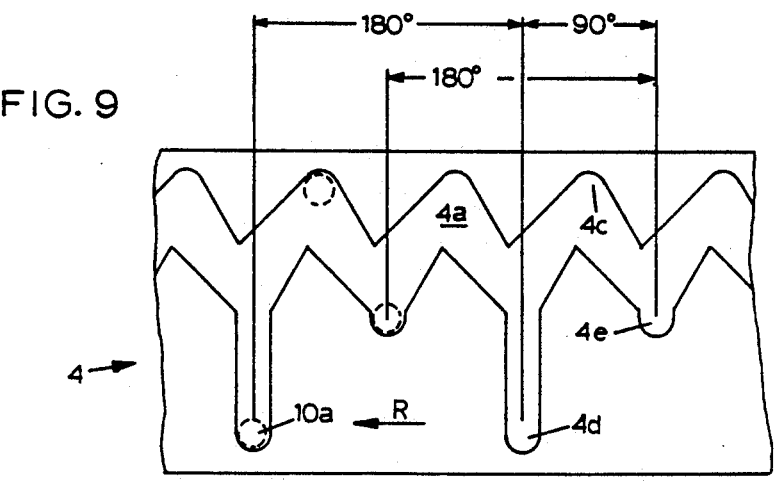
FIG. 9 is a development of the surface of an element in the tool with serpentine grooves, cam stop surfaces and cam passing grooves connected as shown in FIGS. 2 and 4.

To understand how drilling proceeds, with fluid flow through the tool, refer to FIGS. 5 and 9. The piston 3a always moves down when fluid flow produces a significant pressure drop through restrictor 12 (or attached drill string elements below the tool if adequate) but on alternate occasions of fluid flow increase from a low flow to high flow pins 10a and 10b enter pockets 4e in serpentine groove 4a, to stop the downward movement after a short excursion. When fluid flow is decrease at the surface spring 8 moves assembly 3 upward and the pins and grooves rotate turret 4 to complete one rotational increment. When fluid flow is increased again, pins 10b enter axially extending grooves 4d and assembly 3 can move down to the excursion limit.

When assembly 3 moves downward, after a preselected amount, cams 3g move along key 2e to release the portion 2 from straight configuration. Deflector cam 14, welded to piston extension 3e, engages cam follower surface 2d and urges portion 2 to pivot about pivot axis PA until surface 2c engages the wall 1f as shown in FIG. 4. Flexible hose 5 bends to accommodate the flexing movement. The mechanical deflection is shown as four degrees between axes CL1 and CL2. In service, deflection limits are shop selected by the cut of surface 2c and rarely exceed three degrees. A drilling motor is normally connected to tool joint 2a and the tool and motor represent a massive but long structure that will further deflect under column load of drilling.

When drilling fluid flow is stopped to make connection the assembly 3 will be urged upward but a deflected well bore may tend to hold the tool deflected and cams 3g are usually trapped by key 2e. When fluid flow is restarted extension 3 moves directly back to the deflected state. When it is necessary to straighten the tool, with no flow, the drill string can be rotated about 180 degrees from the surface to reverse the well induced strain on the tool and the cam 3g will be released.

To indicate at the surface that deflection is retained, throttle rod 9, an optional feature, moves downward into the restrictor 12, also optional, to increase flow resistance for surface detection as stand pipe pressure. When assembly 3 moves upward, whether a result of deliberate manipulation or inadvertently during connections, throttle 9 moves upward to decrease fluid flow resistance of resistor 12 for detection as reduced stand pipe pressure at selected flow rates.

Some degree of sealing is required in the piston area and seals captioned S represent the sealing required. Hose assembly 5 is suspended in bore 3j of the piston extension. The turret driver cap 3k is threadedly attached to tower 3f and supports spring loading ring 13. A threaded connection exists (not shown) between flanges 1b and 1d to make possible the installation of assembly 3 that is confined in opening 1c. Member 11 is proportioned to provide axial bearing support for turret 4 in opening 1a for rotation therein. Rotation of assembly 3 within the body is prevented by cams 3g which are always confined by keys 2e. Throttle 9 is captured in the threaded connection at the top of tower 3f by ring 9a. Piston projection 3b allows wrenches to be used when assembling the tower and piston.

FIGS. 3 and 4 have been described in association with FIGS. 1 and 2 and show the tool in the deflected configuration, or state. Throttle 9 is shown in the bore of restrictor 12 to cause the pressure increase detectable at the surface to indicate the deflected state. Cams 3g are accepted in the clearance 2g and cam pins 10 are seen to be in the axial extensions from groove 4a more clearly seen in FIG. 9.

FIG. 5 shows the relationship of the turret 4 and turret driver 3c. Driver 3c is a cap on the tower 3f, both attached to and moving with piston 3a as parts of the axially movable shuttle assembly 3.

FIG. 6 shows the support for wash tube 6. Washer 7 is split at 7e to permit assembly through windows 3d of tower 3f to engage the tube 6 in groove 6a by way of close fitting bore 7c. Windows 7d permit fluid pressure to reach piston 3a. The wrench projection 3b is visible through the window 7d.

Figure 7:
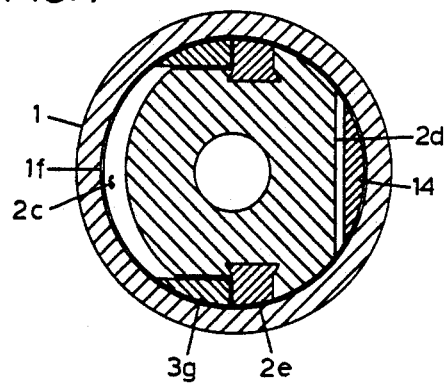
FIG. 7 is a sectional view taken along line 7—7 of FIG. 2.

FIG. 7 shows the relationship of cams 3g and cam followers 2e. The cam 14 can be seen in position to engage cam follower surface 2d when the shuttle moves farther downward. Surface 2c has the same radius as surface 1f. When the shuttle moves downward and cam 14 engages surface 2d to deflect the lower portion 2 of the tool cams 3g are accepted by receding surfaces on cam followers 2e (see FIG. 4) and surface 2c is forced against surface 1f.

Figure 8:
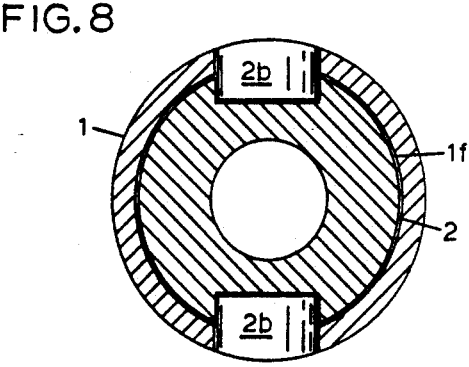
FIG. 8 is a sectional view taken along line 8—8 of FIG. 2.

FIG. 8 shows pivot pins 2b situated in cross bores in both portions 1 and 2 of the body to rotationally and axially secure the two body portions together.

FIG. 9 represents a development of the surface of bore 4b of turret 4 with serpentine groove 4a and axial grooves thereto connected. Groove 4a is continuous about the periphery of the bore. Two cam pins 10a and 10b, spaced 180 degrees apart ride in the groove. One pin 10a is shown in the three significant stable positions. The dotted pin in the top position shows the position when the tool is assembled and before fluid flow moves the shuttle downward. When fluid flow is started, the shuttle moves the pin down to the middle position where it stops downward movement of the shuttle and the tool remains in the straight configuration. When fluid flow is reduced below a preselected amount the shuttle moves upward to the position near the 4a caption. When fluid flow is again increased above a preselected amount the shuttle moves the pin downward and it is directed into groove 4d allowing the shuttle to move farther down where it is stopped by the associated cams previously described for FIG. 4 and the tool is in the deflected configuration. The pins move only axially and the turret is urged to move only by the pins, in cooperation with the groove, and the turret rotates only in the direction shown by arrow R. There are two pins and the groove has two phases. Any reasonable number of pins can be used provided adequate phases are provided in the groove, further, the sequence can be altered such that a plurality of pockets 4e exists between adjacent grooves 4d. Similarly, a plurality of grooves 4d can exist between adjacent pockets 4e. The arrangement shown is preferred.

From the foregoing, it will be seen that this invention is one well adapted to attain all of the ends and objects hereinabove set forth, together with other advantages which are obvious and which are inherent to the tool.

It will be understood that certain features and sub-combinations are of utility and may be employed without reference to other features and sub-combinations. This is contemplated by and is within the scope of the claims.

As many possible embodiments may be made of the tool of this invention without departing from the scope thereof, it is to be understood that all matter herein set forth or shown in the accompanying drawings is to be interpreted as illustrative and not in a limiting sense.

The invention having been described, I claim:

1. A directional down hole drilling tool for use as an element of a pipe string in a well for selecting from the surface the choice of straight configuration or deflected configuration by selectively cycling the rate of flow of fluid down the pipe string, a cycle comprising increasing the flow rate from less than a first preselected rate to more than a second preselected rate and then decreasing the rate to less than said first rate, the tool comprising:
   a) a body comprising a first and a second portion, each portion having an independent longitudinal axis, one portion telescoped into the other and the two portions axially and rotationally secured together for relative flexing about a pivot axis generally transverse both said axes with means at each end of the assembled body for fluid tight attachment to a continuing pipe string to serve as an element thereof with a fluid channel extending longitudinally therethrough;
   b) shuttle means situated in an opening in said body for limited longitudinal movement therein having a piston arranged to cooperate with said opening to provide a fluid power cylinder and at least one spring arranged to move said shuttle means to a first longitudinal position;
   c) stop means situated in said opening arranged to rotate incrementally to a plurality of stop positions, at least one increment position permitting said shuttle to move to a second position and at least one increment position permitting said shuttle to move, farther, to a third position;
   d) incremental rotation cam means, responsive to movement of said shuttle means to rotate said stop means one increment each time said shuttle moves from said first position to said second position and back to said first position;
   e) deflector cam means comprising cam means carried by said shuttle and cam follower means on said second portion to hold said second portion in longitudinal alignment with said first portion when said shuttle means is in said first and said second positions and to deflect the axis of said second portion from the axis of said first portion when said shuttle is in said third position;
   f) actuator channels in said body arranged to communicate fluid pressure from said channel to one side of said piston and to communicate fluid pressure from outside said tool to the opposite side of said piston such that pressure in said channel, greater than pressure in the well, will urge said piston to oppose said spring to move said shuttle from said first position.

2. The tool of claim 1 wherein valve means, responsive to the position of said shuttle, is arranged to change the resistance to flow of fluid in said channel when said shuttle is in said third position to indicate at the surface that the tool is in the deflected state.

3. The tool of claim 1 wherein said stop means comprises a turret mounted in said body for rotation therein, with at least one serpentine groove therein progressing about the periphery thereof, a cam responsive to the movement of said shuttle arranged to engage said groove to rotate said turret one increment each time said shuttle moves from said first position to said second position and back to said first position, said turret having said stop means at each increment to stop axial movement of said shuttle, at least one increment stop arranged to stop said shuttle at said second position and at least one increment stop arranged to allow said shuttle to proceed to said third position.

4. The tool of claim 3 wherein said stop means comprises at least one cam pin carried by said shuttle to provide axial drive means in said groove, said groove, in progressing about said turret periphery providing a guide path of such configuration that said cam after reversing direction of axial movement, from each axial travel extreme, encounters a groove wall surface that cams said turret in the same preselected rotational direction, said stop means for said second position comprising at least one reversal point in the axial progression of said groove, said third position being provided by at least one axially extending groove in communication with said serpentine groove to allow said cam to proceed unchecked until said shuttle is in said third position.

5. The tool of claim 1 wherein said deflector cam means comprises first and second cams carried by said shuttle for movement therewith in said first portion and first and second cam followers carried by said second portion, situated some longitudinal distance from said pivot, arranged for said first cams and cam followers to engage and hold said second portion in alignment with said first portion when said shuttle is in said first and second positions, said second cam and cam follower arranged to engage when said shuttle approaches said third position to force said second portion to said deflected state.

6. The tool of claim 1 wherein said channel comprises bores in a conduit sealingly connected to said second portion, with a flexible length extending from said second portion to a rigid wash pipe sealingly extending through said piston, for relative axial movement therein, said wash pipe secured by a hanger carried by said first portion for support when said shuttle moves axially in said body.

7. The tool of claim 1 wherein said deflector cam means comprises a first deflector cam arranged to conduit lateral forces applied to said second portion cam follower directly to the inner wall of said opening in said first portion, and a constraint cam arranged to engage restraint cam follower surfaces on said second portion and transmit resulting lateral forces directly to the inner wall of said opening in said first portion.

8. The tool of claim 4 wherein said turret comprises a tubular member situated, axially constrained, and bearingly supported for rotation in said first portion.

9. A directional down hole drilling tool for use as an element of a pipe string in a well for selecting from the surface the choice of straight configuration or deflected configuration by selectively cycling the rate of flow of fluid down the pipe string, a cycle comprising increasing the flow rate from less than a first preselected rate to more than a second preselected rate and then decreasing the rate to less than said first rate, the tool comprising:
a) a body comprising a first and a second portion, each portion having an independent longitudinal axis, one portion telescoped into the other and the two portions axially and rotationally secured together for relative flexing about a pivot axis generally transverse both axes of said portions with means at each end of the assembled body for fluid tight attachment to a continuing pipe string to serve as an element thereof with a fluid channel extending longitudinally therethrough;
b) shuttle means situated in an opening in said body for limited longitudinal movement therein having a piston arranged to cooperate with said opening to provide a fluid power cylinder;
c) stop means situated in said opening arranged to rotate incrementally to a plurality of stop positions, at least one position permitting said shuttle to move to a second position and at least one position permitting said shuttle to move, farther, to a third position;
d) incremental rotation cam means, responsive to movement of said shuttle means to rotate said stop means one increment each time said shuttle moves from said first position to said second position and back to said first position;
e) deflector cam means comprising cam means on said shuttle and cam follower means on said second portion to hold said second portion in longitudinal alignment with said first portion when said shuttle means is in said first and said second position and to deflect the axis of said second portion from the axis of said first portion when said shuttle is in said third position;
f) a flow restrictor in said channel to provide a flow related pressure difference across said restrictor when fluid flows through said channel; and
g) fluid channels to conduct fluid pressure from opposite flow related sides of said restrictor to longitudinally opposite sides of said piston arranged to move said piston from said first position when fluid pressure across said restrictor is sufficient to overcome said spring.

10. The tool of claim 9 wherein valve means, responsive to the position of said shuttle, is arranged to change the resistance to flow of fluid in said channel when said shuttle is in said third position to indicate at the surface that the tool is in the deflected state.

11. The tool of claim 9 wherein said stop means comprises a turret mounted in said body for rotation therein, with at least one serpentine groove therein progressing about the periphery thereof, a cam responsive to the movement of said shuttle arranged to engage said groove to rotate said turret one increment each time said shuttle moves from said first position to said second position and back to said first position, said turret having said stop means at each increment to stop axial movement of said shuttle, at least one increment stop arranged to stop said shuttle at said second position and at least one increment stop arranged to allow said shuttle to proceed to said third position.

12. The tool of claim 11 wherein said stop means comprises at least one cam pin carried by said shuttle to provide axial drive means in said groove, said groove, in progressing about said turret periphery, providing a guide path of such configuration that said cam after reversing direction of axial movement, from each axial travel extreme, encounters a groove wall surface that cams said turret in the same preselected rotational direction, said stop means for said second position comprising at least one reversal point in the axial progression of said groove, said third position being provided by at least one axially extending groove in communication with said serpentine groove to allow said cam to proceed unchecked until said shuttle is in said third position.

13. The tool of claim 9 wherein said deflector cam means comprises first and second cams carried by said shuttle for movement therewith in said first portion and first and second cam followers carried by said second portion, situated some longitudinal distance from said pivot, arranged for said first cams and cam followers to engage and hold said second portion in alignment with said first portion when said shuttle is in said first and second positions, said second cam and cam follower arranged to engage when said shuttle approaches said third position to force said second portion to said deflected state.

14. The tool of claim 9 wherein said channel comprises bores in a conduit sealingly connected to said second portion, with a flexible length extending from said second portion to a rigid wash pipe sealingly extending through said piston, for relative axial movement therein, said wash pipe secured by a hanger carried by said first portion for support when said shuttle moves axially in said body.

15. The tool of claim 9 wherein said deflector cam means comprises a first deflector cam arranged to conduct lateral forces applied to said second portion cam follower directly to the inner wall of said opening in said first portion, and a constraint cam arranged to engage restraint cam follower surfaces on said second portion and transmit resulting lateral forces directly to the inner wall of said opening in said first portion.

16. The tool of claim 11 wherein said turret comprises a tubular member situated, axially constrained, and bearingly supported for rotation in said first portion.

* * * * *